United States Patent
Waldeck et al.

[11] Patent Number: 5,951,098
[45] Date of Patent: Sep. 14, 1999

[54] SAFETY DOOR FOR RIGHT-HAND STAND-UP TRUCK

[75] Inventors: Ronald Waldeck, Louisville; Douglas Jones, Westport, both of Ky.

[73] Assignee: Fontaine Modification Company, Charlotte, N.C.

[21] Appl. No.: 08/912,209

[22] Filed: Aug. 15, 1997

[51] Int. Cl.⁶ .................................................. B60J 5/04
[52] U.S. Cl. .................. 296/190.11; 49/142; 49/371; 296/146.11; 296/146.12; 296/202
[58] Field of Search ....................... 180/286; 296/146.01, 296/146.11, 190.01, 190.03, 146.12, 190.08, 190.11, 202; 49/142, 163, 246, 371, 388, 502

[56] References Cited

U.S. PATENT DOCUMENTS

| | | |
|---|---|---|
| 533,692 | 2/1895 | Williams . |
| 679,822 | 8/1901 | Bahrenburg . |
| 971,617 | 10/1910 | Jump .................................. 49/254 |
| 1,146,805 | 7/1915 | McAvoy . |
| 1,537,959 | 5/1925 | Morine ........................... 296/146.11 |
| 1,689,765 | 10/1928 | Baxter ............................ 296/146.11 |
| 1,706,502 | 3/1929 | Spring . |
| 1,757,860 | 5/1930 | Hall et al. . |
| 1,961,205 | 6/1934 | De Vizcaya .......................... 326/23 |
| 2,626,003 | 1/1953 | Kutzer ............................... 180/286 |
| 2,740,947 | 4/1956 | Davies ............................... 180/286 |
| 2,823,755 | 2/1958 | Hall .................................. 180/286 |
| 2,913,066 | 11/1959 | Leslie et al. ......................... 180/82 |
| 2,938,749 | 5/1960 | Podolan et al. ....................... 296/44 |
| 3,014,549 | 12/1961 | Freeman ............................. 180/286 |
| 3,131,782 | 5/1964 | Freeman .............................. 180/82 |
| 3,847,492 | 11/1974 | Kennicutt et al. ..................... 403/224 |
| 3,973,796 | 8/1976 | Suzuki ............................... 296/28 |
| 4,079,985 | 3/1978 | Martin ............................... 296/28 |
| 4,216,725 | 8/1980 | Hallam .............................. 105/348 |
| 4,332,305 | 6/1982 | Kocolowski .......................... 180/271 |
| 4,339,147 | 7/1982 | Kimzey .............................. 296/24 |
| 4,691,958 | 9/1987 | Miller .............................. 296/146 |
| 4,930,836 | 6/1990 | Grinn ............................... 296/146 |
| 5,044,472 | 9/1991 | Dammeyer et al. ..................... 187/9 R |

FOREIGN PATENT DOCUMENTS

| | | | |
|---|---|---|---|
| 000612637 | 8/1994 | European Pat. Off. | 296/146.1 |
| 002008520 | 9/1971 | Germany | 296/146.11 |
| 002226228 | 12/1973 | Germany | 296/146.11 |
| 004011787 | 10/1991 | Germany | 296/146.11 |

*Primary Examiner*—D. Glenn Dayoan
*Assistant Examiner*—Paul Chenevert
*Attorney, Agent, or Firm*—Myers, Bigel, Sibley & Sajovec

[57] ABSTRACT

A truck comprises a motorized body including a chassis and a cab. The cab includes opposed sidewalls, one of which includes an access opening having front and rear edge portions. The door that covers the access opening comprises upper and lower panels. The lower panel is pivotally attached to the front edge portion of the opening to rotate about a first substantially vertical axis of rotation between open and closed positions. The upper panel is hinged to the rear edge portion of the opening to rotate about a second substantially vertical axis of rotation between open and closed positions. The upper and lower panels are sized and configured such that, when each is rotated to its closed position, each spans the opening of the cab, and the upper panel is disposed above the lower panel. In such a configuration, the lower panel can be closed to protect the driver, and the upper panel can be moved to its open position to provide ventilation.

13 Claims, 4 Drawing Sheets

SAFETY DOOR FOR RIGHT-HAND STAND-UP TRUCK

FIELD OF THE INVENTION

The present invention relates generally to trucks, and more specifically to trucks in which the driver stands while driving.

BACKGROUND OF THE INVENTION

Many types of specialized trucks exist that are designed to assist in the performance of specific tasks. One such vehicle is the so-called "right-hand stand-up" truck, which is often used in the door-to-door collection of refuse and recyclable materials. For maximum efficiency, door-to-door collection of such materials is generally performed by first driving along one side of a street and collecting material gathered on that side of the street, then driving in the other direction on the other side of the street and collecting material from that side. Of course, in the United States motorists drive on the right side of the road; to accommodate this, right-hand stand-up trucks are designed with the steering wheel on the right side of the truck cab to enable the driver to park the truck, exit the vehicle, and walk to the collection point (which is usually located on or near the sidewalk bordering the street) without having to cross the street. Not only does such a truck increase driver safety, it also improves efficiency immensely. A driver may be forced to enter and exit the vehicle as many as 500 times per day, so any reduction in his activity and motion decreases his time at each collection stop.

Another aspect of the stand-up truck that improves efficiency is the configuration of the cab interior. Because the driver exits and re-enters the truck so often during the course of a day, stand-up trucks are designed so that the driver stands while driving. This configuration allows the driver to simply step into and out of the truck during collection rather than having to rise from a seated position at each collection point. This configuration both improves collection speed and reduces driver fatigue.

One of the major concerns for this type of vehicle is the safety of the driver. Accidents can occur as the driver enters and exits the vehicle, and also while the vehicle is moving. Because productivity is so important in this type of truck, in many instances the driver's access door is left open during driving and collection due to the frequency with which the driver must enter and exit. Also, most of these vehicles lack air conditioning and windows that can be opened to provide ventilation. As a result, many drivers drive with the door open to ventilate the cab. Of course, leaving the door open while driving increases both the risk of accidents occurring and the severity of injuries suffered in such an accident.

Some tentative proposals have been offered to protect the standing driver. These include chains, belts and rigid metal bars that extend across the door frame of the access door. None of these proposals is particularly satisfactory. First, they provide only minimal protection for the driver. Second, they decrease productivity because they require an extra operation for the driver to perform each time he enters and exits. Because of this, only a very small percentage of the drivers regularly use these safety devices, which, of course, defeats the purpose of having such devices.

SUMMARY OF THE INVENTION

In view of the foregoing, it is an object of the present invention to provide a right-hand stand-up truck that protects drivers as they drive while standing.

It is another object of the present invention to provide a right-hand stand-up truck that can be ventilated during operation without sacrificing safety.

It is also an object of the present invention to provide a right-hand stand-up truck that is easily entered and exited by the driver.

These and other objects are satisfied by the present invention, which relates to a right-hand stand-up truck having an access door split into upper and lower panels. The truck comprises a motorized body including a chassis and a cab. The cab includes opposed sidewalls, one of which includes an access opening having front and rear edge portions. The door that covers the access opening comprises the upper and lower panels. The lower panel is pivotally attached to the front edge portion of the opening to rotate about a first substantially vertical axis of rotation between open and closed positions. The upper panel is hinged to the rear edge portion of the opening to rotate about a second substantially vertical axis of rotation between open and closed positions. The upper and lower panels are sized and configured such that, when each is rotated to its closed position, each spans the opening of the cab, and the upper panel is disposed above the lower panel. In such a configuration, the lower panel can be closed to protect the driver, and the upper panel can be moved to its open position to provide ventilation.

In a preferred embodiment, the truck includes means for disabling operation of the truck (preferably by disengaging the transmission) when the lower panel of the door is in its open position. This ensures that the truck is not driven without the lower door in its safer closed position.

DETAILED DESCRIPTION OF THE PREFERRED EMBODIMENTS OF THE INVENTION

The present invention will be described more particularly hereinafter with reference to the accompanying drawings. The invention is not intended to be limited to the illustrated embodiments; rather, these embodiments are intended to fully and completely disclose the invention to those skilled in this art.

Figure 1:
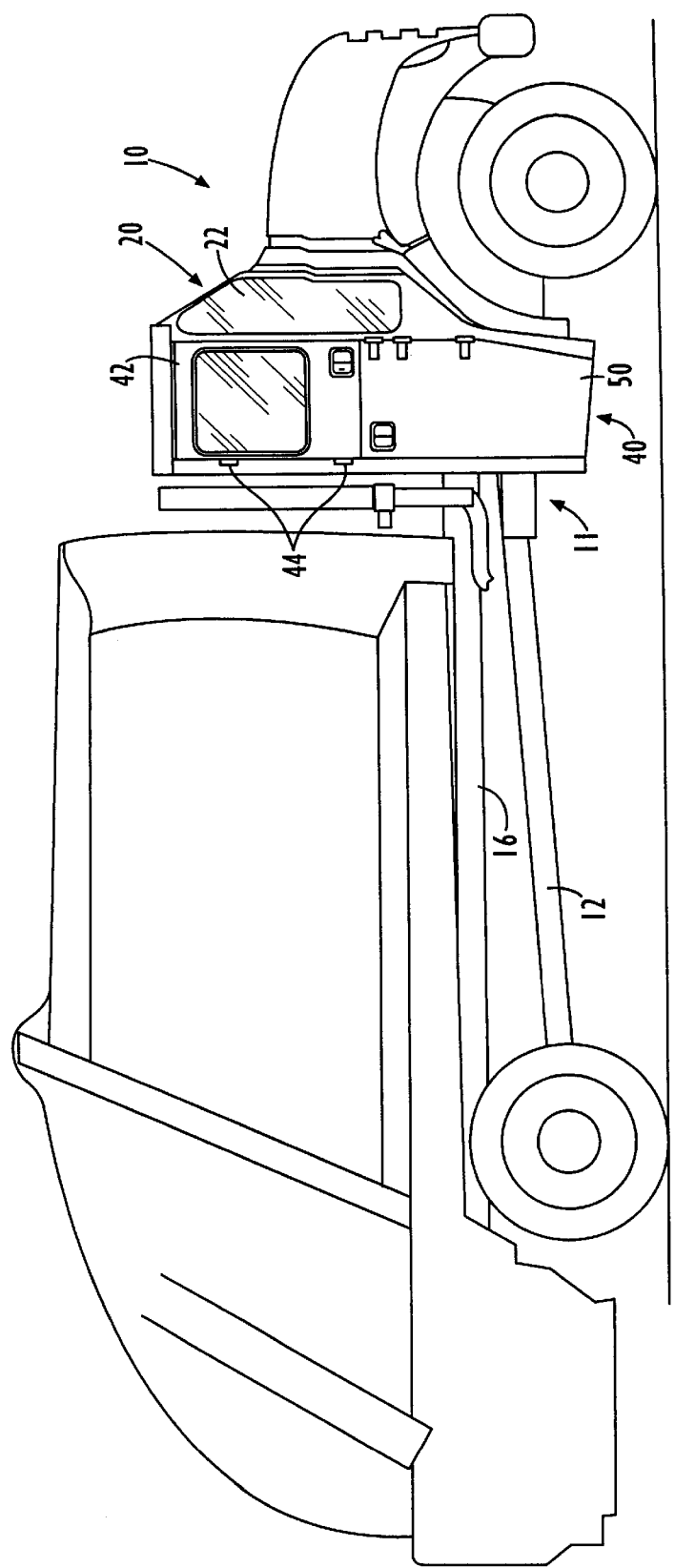
FIG. 1 is a side view of a right hand stand-up truck of the present invention.
Figure 2:
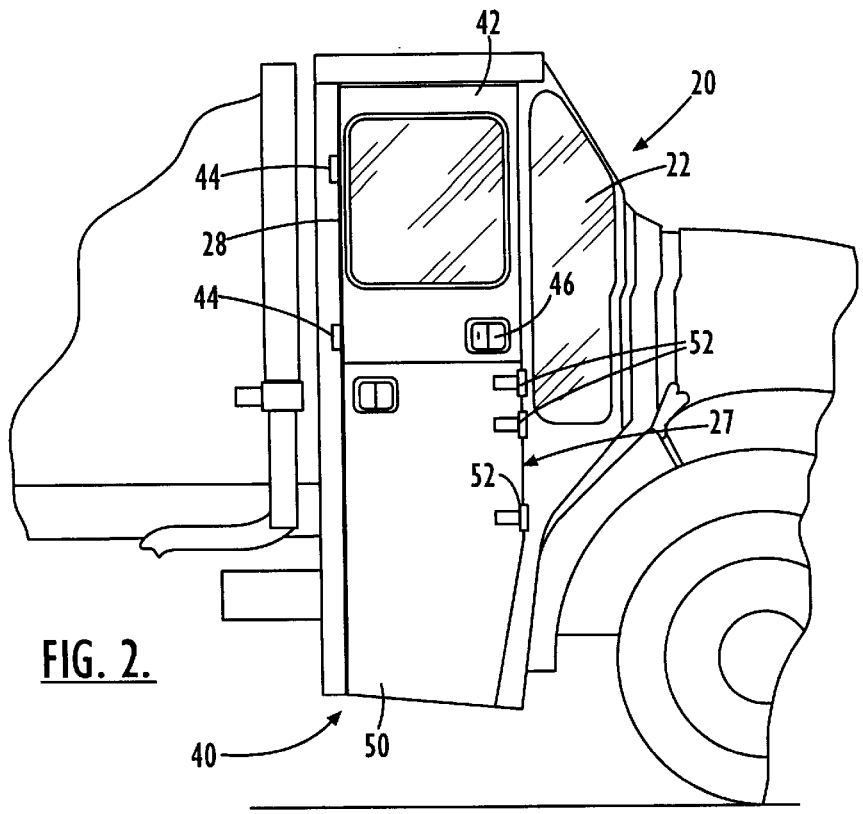
FIG. 2 is an enlarged side view of the truck of FIG. 1 showing the upper and lower panels of the door in their closed positions.

Referring now to the drawings, a right hand stand-up truck, designated broadly at 10, is illustrated in FIG. 1. The truck 10 includes a motorized body 11 having a chassis 12 upon which is mounted a transmission 14 (represented schematically in FIG. 6), a bed 16 for holding collectible materials, such as recyclable materials or garbage, and a cab 20 positioned on the forward portion of the chassis 12. Those skilled in this art will recognize that, although the truck configuration illustrated herein is preferred, any number of truck configurations can be employed with the present invention.

Figure 3:
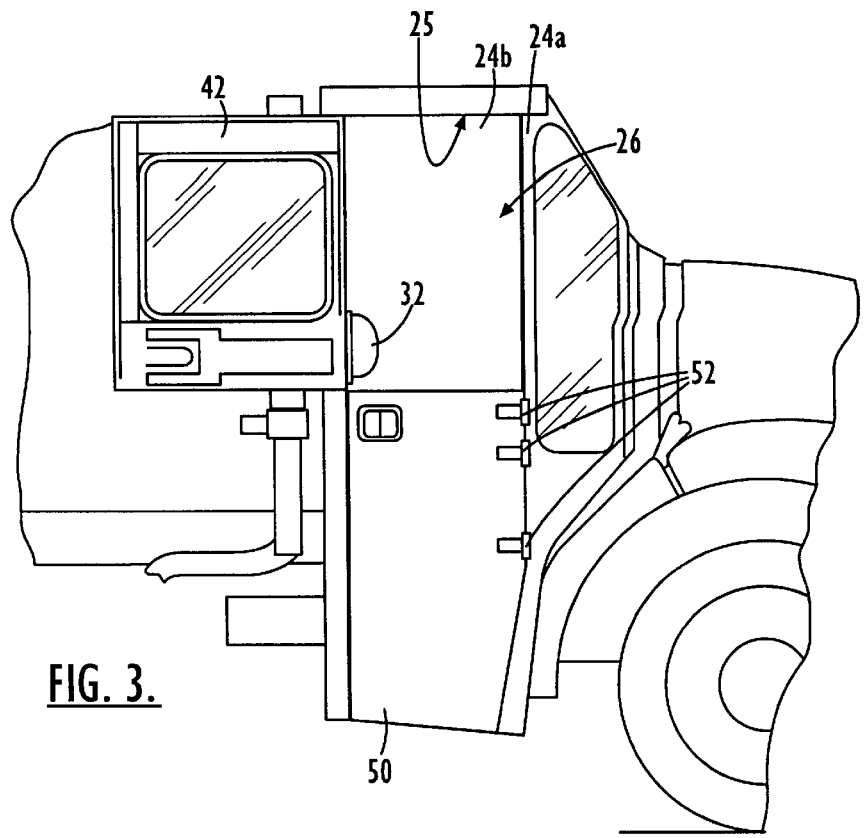
FIG. 3 is an enlarged side view of the truck of FIG. 1 showing the upper door panel in its open position.
Figure 4:
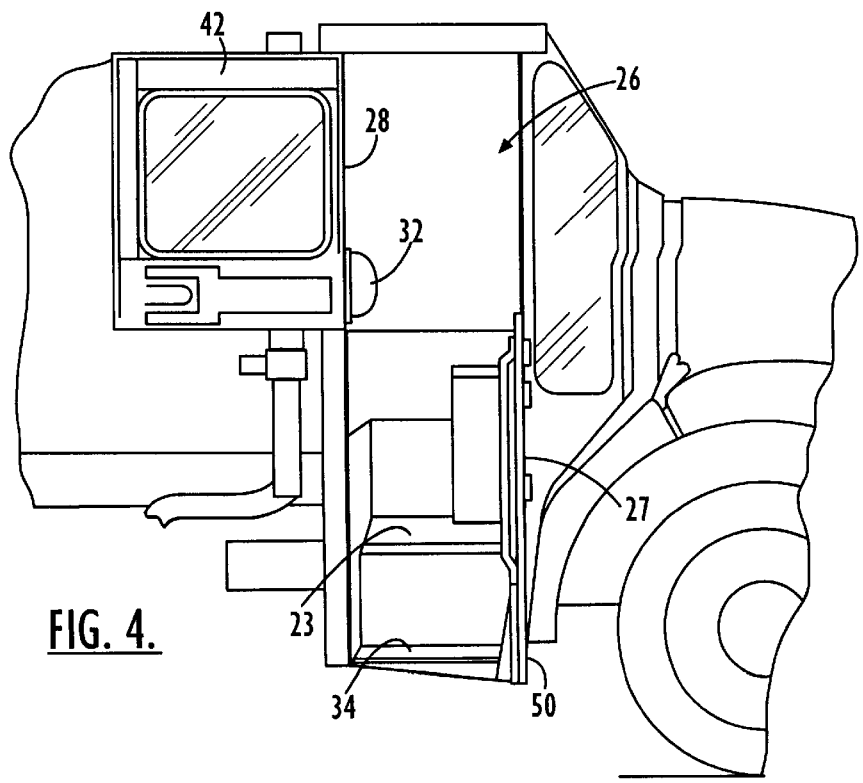
FIG. 4 is an enlarged side view of the truck of FIG. 1 showing both the upper and lower door panels in their open positions.

The cab 20 (best seen in FIGS. 2 through 5 and which, of course, serves as the compartment for a driver of the truck 10) includes a windshield 22 in its front portion that the driver of the truck 10 faces while driving, a floor 23, a pair of opposed sidewalls 24a, 24b, and a ceiling 25. The floor 23 and ceiling 25 are separated by a sufficient distance (typically between about 72 and 80 inches) that a driver can stand while driving. The cab 20 also includes a back support 32 (FIGS. 3 and 4) to support the driver's back as he stands to drive.

In the front lower section of the cab 20 (FIG. 5), an accelerator pedal 30a and a brake pedal 30b are suspended from a vertical panel 31 just above the floor 23 to enable the driver of the truck to propel and stop the truck 10. Also, a step 34 is located below the floor 23 of the cab to assist the driver in entering and exiting the cab 20.

Those skilled in this art will appreciate that, although the illlustrated configuration of the cab 20 is preferred, other cab configurations can be used with the present invention. For example, the cab may be arranged so that the driver stands on the left side of the truck (particularly if the truck is to be used in countries in which motorists drive on the left side of the road), or in the center of the truck if operations so dictate. Also, other items or accessories, such as a pull-down seat for the driver when driving longer distances between stops (such as to and from a collection drop-off point), may also be included in trucks of the present invention.

Referring again to FIGS. 2 through 5, the sidewall 24a includes an access opening 26 through which the driver of the truck 10 can enter the cab 20. The opening 26, which includes a front edge portion 27 positioned toward to the front of the cab 20 and a rear edge portion 28 positioned toward the rear of the cab 20, is sized to enable a full-sized adult to enter the cab while standing. Typically, the cab opening 26 is between about 22–28 inches in width.

Referring again to FIGS. 2 through 4, the cab opening 26 can be partially or completely closed by a two-piece door 40, which comprises an upper panel 42 and a lower panel 50. The upper panel 42 is pivotally attached to the upper rear edge portion 28 of the cab opening 26 with a pair of hinges 44. The positioning of the hinges 44 on the upper rear edge portion 28 of the cab opening 26 causes the upper panel 42 of the door to rotate about a substantially vertical axis of rotation between a closed position (FIG. 2), in which the upper panel 42 spans the upper portion of the cab opening 26 and the inner surface of the upper panel 42 faces into the cab 20, and an open position (FIGS. 3 and 4), in which the upper panel 42 is positioned rearwardly from the opening 26 and the inner surface of the upper panel 42 faces away from the cab 20. The upper panel 42 includes a retaining latch 46 that cooperates with a mating structure (not shown) located on the sidewall 24a for maintaining the upper panel 42 in its closed position, and further includes a retaining mechanism (not shown) that retains the upper panel 42 in its open position when desired.

The lower panel 50 is attached to the lower front edge portion 27 of the cab opening 26 with three hinges 52. The hinges 52 pivotally interconnect the lower panel 50 with the lower front edge portion 27 of the cab opening 26 so that the lower panel 50 can rotate about a substantially vertical axis of rotation between a closed position (FIGS. 2 and 3), in which the lower panel 50 spans the lower portion of the cab opening 26 and the inner surface of the lower panel 50 faces into the cab 20, and an open position (FIG. 4), in which the lower panel 50 is positioned approximately even with the front edge portion 27 of the opening 26 and the inner surface of the lower panel 50 faces generally rearwardly.

Figure 5:
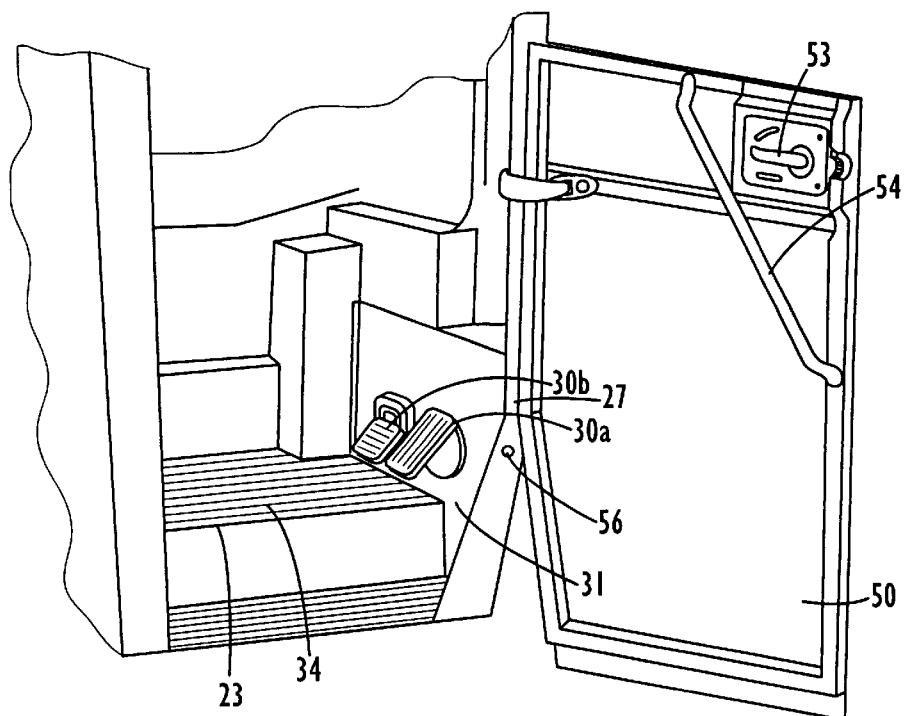
FIG. 5 is an enlarged perspective view of a portion of the interior of the cab of the truck of FIG. 1 with the lower door in its open position.

As seen in FIG. 5, the inner surface of the lower panel 50 includes an exit handle 53 that maintains the lower panel 50 in the closed position. A generally vertically-disposed entry assist handle 54 protrudes from the inner surface of the lower panel 50; it can be grasped by a driver to assist him in entering the cab 20.

FIG. 5 also illustrates a transmission disengaging button 56 positioned on the opening front edge portion 27. The transmission-disengaging button 56 is pressed down when the lower panel 50 is in its closed position and rises when the lower panel 50 is in its open position.

Figure 6:
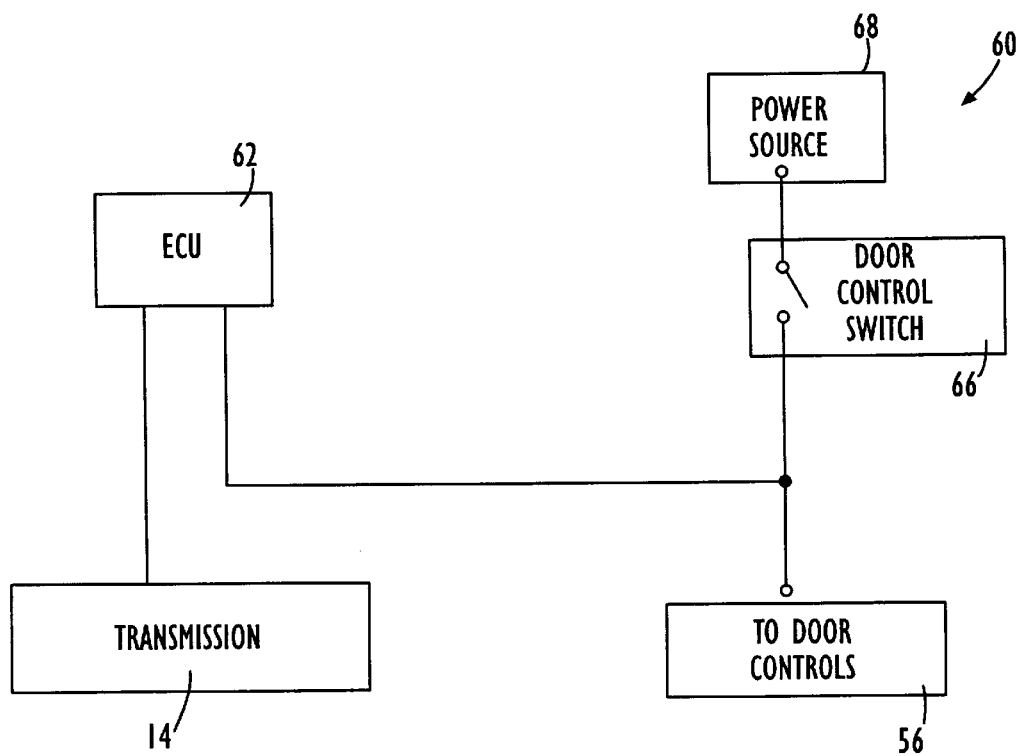
FIG. 6 is a schematic diagram of the electronic controls that engage the transmission of the truck of FIG. 1 when the lower door is in its closed position.

FIG. 6 illustrates schematically a transmission-disengaging unit 60 that is actuated by the transmission-disengaging button 56. The transmission-engaging unit 60 includes a door control switch 66 which is electrically connected with the transmission engaging button 56 and with a door switch power source 68. The door control switch 66 is also electrically connected to an electronic control unit 62 through a vehicle interface connector (not shown). The electronic control unit 62 is then electrically connected to the transmission 14.

In operation, when the lower panel 50 of the door 40 is in its closed position, the transmission-disengaging button 56 is pressed. Actuation of the transmission-disengaging button 56 causes the door control switch 66 to close and complete the electric circuit illustrated in FIG. 6. Once the circuit is closed, the electric control unit 62 is free to shift the transmission 14 into gear so that the truck 10 can be propelled. Conversely, when the lower panel 50 is in its open position, the transmission-disengaging button 56 is not pressed, so the door control switch 66 remains open, and the circuit is not completed. As such, the electrical control unit 62 is disabled from shifting the transmission 14 into gear, and the truck 10 remains stationary.

This configuration addresses one of the primary concerns with prior right-hand stand-up trucks. In prior trucks, safety devices designed to protect the driver while driving are often cumbersome to use and therefore went unused. Because the transmission 14 of the truck 10 cannot shift into gear unless the lower panel 50 of the door 40 is in its closed position (absent some other manipulation of the transmission-disengaging button 56, such as a wedge placed between the button 56 and the lower panel 50), the driver cannot operate the truck 10 without the lower panel 50 being closed. As a result, safer operation of the truck 10 is ensured. Of course, other means of disengaging the transmission when the lower panel 50 is in its open position, such as latches, electric contact switches, and the like, can also be employed with the present invention.

Those skilled in this art will appreciate that, although the illustrated configuration of the transmission disengagement unit 60 is preferred, other means of disabling operation of the truck 10 can also be employed with the present invention. For example, the ignition system of the truck 10 can be coupled with the lower panel 50 such that opening of the lower panel 50 disables the ignition system and renders the truck inoperable. As another example, opening of the lower panel 50 can be coupled to the brake system so that the wheels cannot turn.

The truck of the present invention also addresses other aforementioned concerns about prior trucks. The inclusion of the exit handle 53 renders the lower panel 50 very easy to move into its open position. Consequently, prior concerns about the cumbersome nature of other safety devices that lead to their non-use are also addressed by the present invention.

In addition, the ability of the upper panel 42 to move to its open position independently of the lower panel 50 allows the cab 20 to be ventilated while the driver is operating the truck 10. Because the upper panel 42 is hinged to the rear edge portion 28 of the cab opening 26, and therefore is positioned to the rear of the opening 26 in its open position, air can flow through the upper portion of the opening 26 when the upper panel 42 is in its open position. Ventillation would be substantially reduced if the upper panel 42 were hinged to the front edge portion of the opening 26.

Those skilled in this art will appreciate that other configurations for the upper and lower panels 42, 50 may also be suitable for trucks of the present invention. For example, more than two panels may be employed if desired. Also, the range of motion of the illustrated and preferred upper and lower panels can be altered; the upper panel 42 need not open as fully as it does in the truck 10, and the lower panel 50 may open to a greater degree, particularly if used with a truck that lacks a wheel well directly in front of the opening 26.

The foregoing embodiments are illustrative of the present invention, and are not to be construed as limiting thereof. The invention is defined by the following claims, with equivalents of the claims to be included therein.

That which is claimed is:

1. A truck for door-to-door collection, comprising:

a motorized body including a chassis and a cab, said cab including opposed side walls and a front windshield such that a driver of said truck faces forwardly, one of said side walls including an opening having front and rear edge portions;

a door comprising upper and lower panels, said lower panel being pivotally attached to said front edge portion of said opening to rotate outwardly about a first substantially vertical axis of rotation between open and closed positions, said upper panel being hinged to said rear edge portion of said opening to rotate outwardly about a second substantially vertical axis of rotation between open and closed positions, said upper and lower panels being sized and configured such that, when each is rotated to its closed position, each spans said opening of said cab, and said upper panel is disposed above said lower panel.

2. The truck defined in claim 1, wherein said cab is sized and configured such that the driver of said truck stands while driving.

3. The truck defined in claim 1, wherein said cab opening is located on the driver's right side as the driver faces said windshield.

4. The truck defined in claim 3, further comprising foot pedals for propelling and stopping said truck, wherein said foot pedals are located on the right side of said cab.

5. The truck defined in claim 1, further comprising a transmission mounted to said chassis and disengaging means for disengaging operation of said transmission, said disengaging means being operatively coupled with said lower door panel such that, when said lower door panel is in its closed position, said transmission can be engaged, and when said lower panel is in its open position, said transmission is disengaged.

6. The truck defined in claim 1, further comprising means for retaining said upper panel in its open position.

7. The truck defined in claim 1, wherein said cab further comprises a floor and a step positioned beneath said floor and adjacent said opening to assist the driver in exiting and entering said cab.

8. A truck for door-to-door collection, comprising:

a motorized body including a chassis, a transmission mounted on said chassis, and a cab, said cab including opposed side walls and a front windshield such that a driver of said truck faces forwardly, one of said side walls including an opening having front and rear edge portions;

a door comprising upper and lower panels, said lower panel being pivotally attached to said front edge portion of said opening to rotate outwardly about a first substantially vertical axis of rotation between open and closed positions, said upper panel being hinged to said rear edge portion of said opening to rotate outwardly about a second substantially vertical axis of rotation between open and closed positions, said upper and lower panels being sized and configured such that, when each is rotated to its closed position, each spans said opening of said cab, and said upper panel is disposed above said lower panel; and disabling means for disabling operation of said truck, said disabling means being operatively coupled with said lower door panel such that, when said lower door panel is in its closed position, operation of said truck is enabled, and when said lower panel is in its open position, operation of said truck is disabled.

9. The truck defined in claim 8, wherein said cab is sized and configured such that the driver of said truck stands while driving.

10. The truck defined in claim 8, wherein said cab opening is located on the right side of said cab.

11. The truck defined in claim 10, further comprising foot pedals for propelling and stopping said truck, wherein said foot pedals are located on the right side of said cab.

12. The truck defined in claim 8, wherein said cab further comprises a floor and a step adjacent said opening to assist the driver in exiting and entering said cab.

13. The truck defined in claim 8, wherein said disabling means comprises transmission disengagement means operatively coupled to said transmission such that, when said lower panel is in its open position, said transmission is disengaged, and when said lower panel is in its closed position, said transmission is engaged.

\* \* \* \* \*